Figure 1:
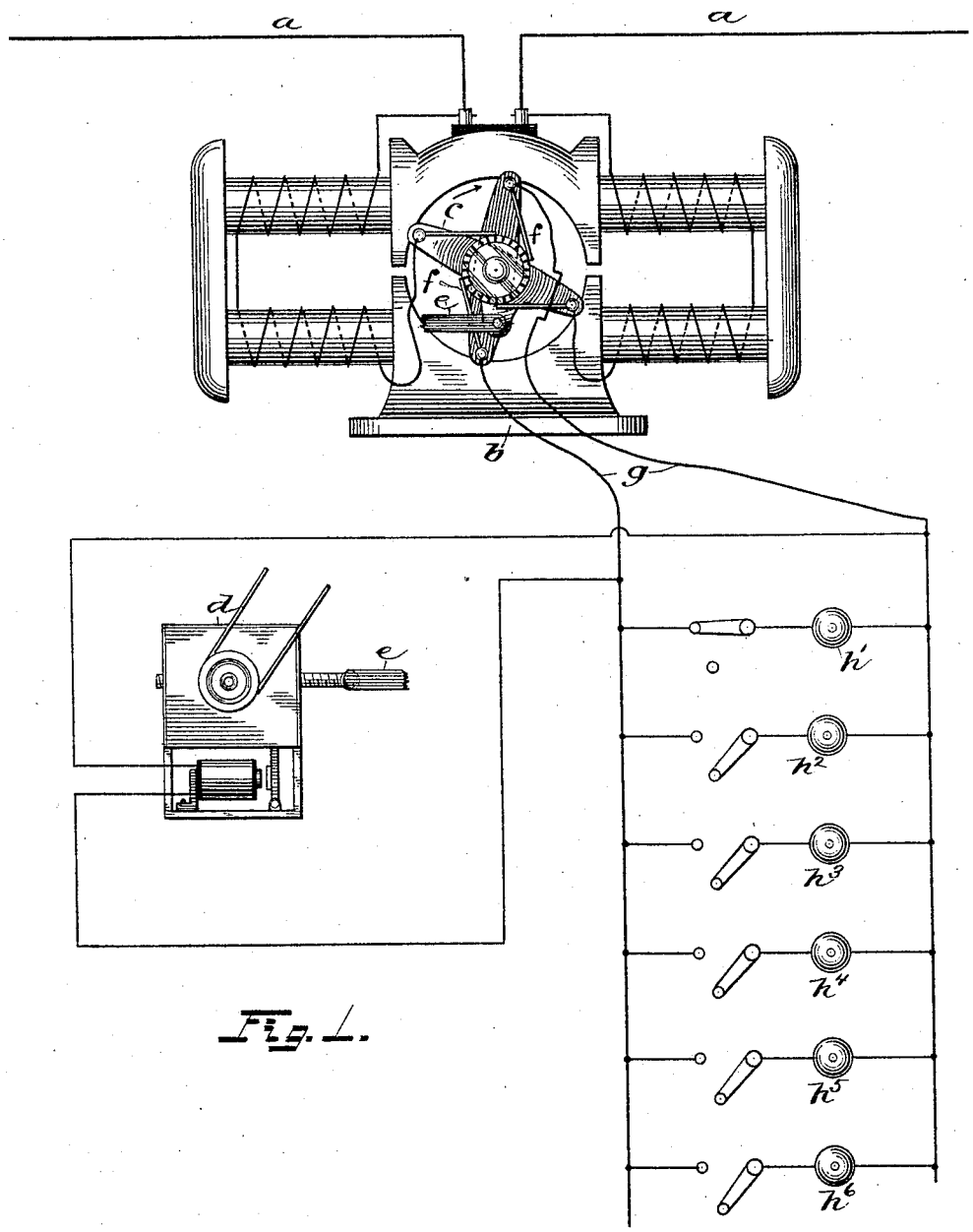

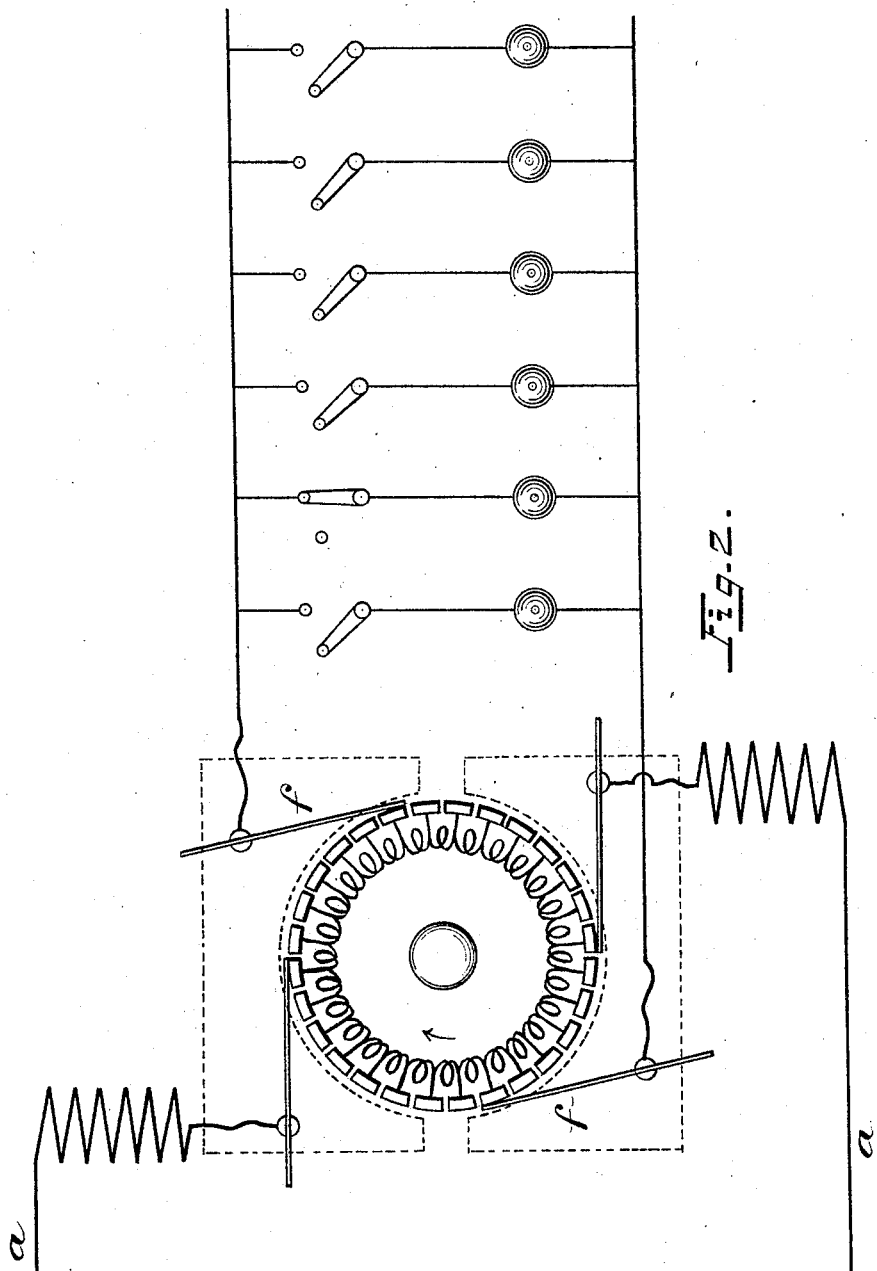

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

MOTOR-GENERATOR.

SPECIFICATION forming part of Letters Patent No. 574,278, dated December 29, 1896.

Application filed June 1, 1889. Serial No. 312,923. (No model.)

*To all whom it may concern:*

Be it known that I, CHARLES E. SCRIBNER, a citizen of the United States, residing at Chicago, in the county of Cook and State of Illinois, have invented a certain new and useful Improvement in Motor-Generators, (Case No. 199,) of which the following is a full, clear, concise, and exact description, reference being had to the accompanying drawings, forming a part of this specification.

My invention relates to motor-generators, and its object is, speaking generally, to distribute electric energy from one source of supply to a circuit in which the work is to be done in such quantities and of such character as may be desired without wasteful loss of energy.

My invention is such that the required working current may be obtained and maintained notwithstanding changes in the amount of work to be done, and although the source of supply may vary at different periods or may fluctuate in energy within wide limits. Speaking generally, as long as there is energy in the supply-circuit I can obtain current to do the work required of the voltage and strength desired or required within the limits of the capacity of the supply-current. My invention is thus especially useful in incandescent systems of lighting, for example, where the supply-current is derived from a constant-current generator whose electromotive force may be varied to maintain the constant-current strength.

By an adjustment of my apparatus I am enabled to obtain from a constant current of variable voltage a variable current of a constant voltage.

I find it desirable to provide for an automatic adjustment, so that the constant difference in potential of the working circuit may be maintained notwithstanding variations in the load.

In carrying out my invention I may use a dynamo-electric machine of the type described in Letters Patent No. 346,965, granted Ernest P. Warner August 10, 1886, for armature for dynamo-electric machines. The machine is connected up in the supply-circuit to act as a motor as to the energy derived from said supply-current. The different terminals of the working circuit are connected with a separate pair of brushes which in incandescent lighting systems may have a determinate position upon the commutator. The pair of brushes connected with the supply-circuit may be varied in their position upon the commutator as may be required by the number of lamps which are being supplied with energy. When the lamps are increased in number, the brushes in the supply-circuit should be moved back, so as to increase the voltage of the motor. Thus the voltage derived from the supply-current may be increased by changing the position of the motor-brushes, thus increasing the volume of current in the working circuit.

I preferably provide a separate machine at each building. That is to say, the main supply-circuit may be run through the streets from building to building, returning to the central office, and along this main supply-circuit, at the different buildings, may be placed machines through the medium of which current may be furnished to the lamps of the different buildings. That is to say, a separate machine is provided to supply each particular group of lamps, as, for example, the group of a particular building. These machines are so constructed and operated that the energy of the current taken off at a particular distributing-point will correspond to that required by the lamps or translating devices supplied therefrom, whatever may be the number in use.

My invention is illustrated in the accompanying drawings, in which—

Figure 1 is a diagram showing my motor-generator with the pair of motor-brushes thereof in the supply-circuit and the other pair of brushes in an incandescent-lamp circuit, together with a regulator for moving the motor-brushes automatically about the commutator to maintain a constant pressure or voltage in the lamp-circuit. Fig. 2 is an illustrative diagram showing the main circuit and the lamp-circuit and the different pairs of brushes of the motor-generator connected therewith.

Like parts are indicated by similar letters of reference throughout both figures.

The main wire $a$ is connected in the usual way through the field-magnets and armature of the motor $b$. The brush-carrier $c$, upon which brushes of any usual form are mounted, is adapted to be rotated about the shaft of the armature by means of a regulator $d$, connected therewith by a rod $e$. In addition to this pair of brushes I have provided a pair of brushes $f\,f$, placed in a particular relation to the field-magnets. This position should be that at which practically the greatest amount of current would be taken off if the machine were provided with only said working-current brushes and used as a dynamo. That is to say, these brushes should be placed at or near the neutral line.

The motor-brushes when placed at right angles to the neutral line, if accurately set, would balance the armature, so that it would not be driven. Moving these brushes in one direction from said position would cause the motor to run in one direction and moving them in the other direction would cause the motor to be driven in the opposite direction.

As shown in the drawings, the brushes are set so as to give the current a lead in a direction to rotate the armature in the direction indicated by the arrow. Moving these brushes forward would increase the power of the motor, while moving them in the reverse direction toward the line at right angles to the line of practical commutation would decrease the power of the motor. The current thus supplied to the lamp-circuit $g$, which is connected with the brushes $f$, will vary as the brush-carrier $c$ is rotated upon the shaft. The lamps $h'\,h^2$, &c., are adapted to be connected with circuit $g$ in multiple arc.

In Fig. 1 the regulator $d$ is illustrated as connected in multiple with the translating devices and is therefore responsive to changes in the electromotive force of the circuit $g$, with which it is connected.

An increase of current through the regulator $d$ would cause the rod $e$ to move in a direction to rotate the carrier $c$ backward. In this manner increase of electromotive force in circuit $g$ acts, through the regulator $d$, to move the brush-carrier $c$ in a direction to cut down the current in the regulator to its normal strength. On the other hand, a decrease of current in the circuit of the regulator produced by a decrease of electromotive force causes the regulator $d$ to bring the brush-carrier $c$ forward until the normal strength of current is restored. Thus the desired electromotive force is maintained in the multiple circuits containing the lamps $h'$, &c.

The regulator $d$ may be of any well-known form in which a device responsive to variations in the current through it acts to produce motion in one direction or the other, according as the variation is above or below the normal or predetermined value. I preferably employ the regulator illustrated and described in Letters Patent No. 435,526, dated September 2, 1890.

Any motor or dynamo-electric machine may be used which is adapted to carry two pairs of brushes in the manner hereinbefore described.

I have shown only a single lamp $h'$ in the circuit. When other lamps $h^2\,h^3$, &c., are switched into circuit, the difference of potential between the mains will be diminished on account of the decreased resistance in the working circuit. The regulator $d$ will thus be brought into operation and will act on the carrier $c$ to move the motor-brushes forward to increase the potential of the mains to the normal amount. If these lamps are again cut out, the regulator will act to move the brush-carrier $c$ in the opposite direction, so as to reduce the energy accordingly.

I have described the brushes $f\,f$ as fixed with relation to the field. It is evident that they might be made movable for purposes of regulation. Such movement might be imparted to them by hand or in any other suitable manner. In machines requiring a regulation of the overlap of the brushes for the purpose of adjusting or compensating for spark at the brushes such regulation may be effected as circumstances may require. Several devices for performing this function are well known, and may be readily applied by those skilled in the art.

My invention admits of various modifications which would readily suggest themselves to those skilled in the art, and I therefore do not limit myself to the details of construction shown.

Having thus described my invention, I claim as new and desire to secure by Letters Patent—

1. A motor having a single closed-coil armature and a pair of adjustable brushes in a supply-current and a second pair of brushes in a working circuit in combination with a regulator for moving said adjustable brushes responsively to variations in the potential between the different sides of said working circuit to maintain said potential practically constant, substantially as and for the purpose specified.

2. A motor having a single closed-coil armature and provided with two sets of brushes in combination with a main circuit through the machine and a derived or local circuit connected with one set of brushes and a regulator connected with said local circuit to maintain a constant voltage in the local or working circuit, substantially as and for the purpose specified.

3. A motor having a single closed-coil armature and commutator therefor provided with two sets of brushes, one set having a particular relation to the commutator and the other set being adjustable in combination with a main circuit through the machine and a derived or local circuit connected with the working-circuit brushes and a regulator connected with said local circuit, substantially as and for the purpose specified.

4. A motor placed in a main circuit and provided with two sets of brushes in combination with a group of lamps arranged in multiple arc, said lamp-circuit being connected with one pair of brushes and a regulator in a multiple circuit with the lamps, substantially as described.

5. In a system for the distribution of electrical energy an electric motor having a single closed-coil armature-winding adapted when traversed by a current of electricity in a main circuit connecting to a central station or point of supply to give varying amounts of electrical energy to a local circuit connected to a pair of brushes resting upon its commutator and to electric lamps or other translating devices that may be included in said local circuit, substantially as specified.

6. In a system for the distribution of electrical energy, the combination with a dynamo-electric machine having a single closed-coil armature-winding of a supply-circuit in which said armature is included, and a working circuit connected with a pair of brushes bearing on the single commutator of said dynamo-electric machine, substantially as described.

7. The combination with a single closed-coil armature, of a pair of adjustable brushes on the commutator thereof in a supply-circuit and a second pair of brushes in a working circuit, the said adjustable pair of brushes being revoluble about the commutator for the purpose of varying the potential between the terminals of the working circuit, substantially as described.

In witness whereof I hereunto subscribe my name this 9th day of May, A. D. 1889.

CHARLES E. SCRIBNER.

Witnesses:
GEORGE P. BARTON,
ELLA EDLER.